(12) United States Patent
McWilliams et al.

(10) Patent No.: US 11,059,511 B2
(45) Date of Patent: Jul. 13, 2021

(54) OPTIMIZING ALIGNMENT OF STEERING COLUMN AND STEERING WHEEL DURING VEHICLE PRODUCTION

(71) Applicant: Ford Motor Company, Dearborn, MI (US)

(72) Inventors: John Steven McWilliams, Southgate, MI (US); Kevin Stanton Giaier, Sylvan Lake, MI (US); Fernando Cruz Solis, Tialnepantla de Baz (MX); Amol Bhaskar Kurkute, Westland, MI (US); Madhuri Narvekar, Farmington, MI (US); Erick Michael Lavoie, Dearborn, MI (US); Ronald Patrick Brombach, Plymouth, MI (US)

(73) Assignee: Ford Motor Company, Dearborn, MI (US)

( * ) Notice: Subject to any disclaimer, the term of this patent is extended or adjusted under 35 U.S.C. 154(b) by 792 days.

(21) Appl. No.: 15/444,978

(22) Filed: Feb. 28, 2017

(65) Prior Publication Data

US 2018/0244299 A1    Aug. 30, 2018

(51) Int. Cl.
*B62D 1/02* (2006.01)
*B62D 65/00* (2006.01)
(Continued)

(52) U.S. Cl.
CPC .............. *B62D 1/181* (2013.01); *B62D 1/16* (2013.01); *B62D 1/20* (2013.01); *B62D 65/005* (2013.01);
(Continued)

(58) Field of Classification Search
CPC ...... B62D 1/181; B62D 1/187; B62D 65/005; B62D 1/183; B62D 65/02; B62D 65/06;
(Continued)

(56) References Cited

U.S. PATENT DOCUMENTS 8,666,601 B1   3/2014   Van Wiemeersch et al.
9,889,876 B2 *  2/2018   Russell .................... B62D 1/16
(Continued)

OTHER PUBLICATIONS

A wireless steering wheel gripping sensor for hands on/off detection; Stephan Mühlbacher-Karrer ; Lisa-Marie Faller ; Raiyan Hamid ; Hubert Zangl; 2016 IEEE Sensors Applications Symposium (SAS); pp. 1-5; IEEE Conferences, year 2016.*

*Primary Examiner* — Cuong H Nguyen
(74) *Attorney, Agent, or Firm* — Vincent Mastrogiacomo; Brooks Kushman P.C.

(57) ABSTRACT

A vehicle is able to be set to operate in a factory mode (as opposed to a normal mode) in which certain features are disabled, such as an alarm system, a power liftgate, etc. This allows assembly workers to assemble, test, and calibrate the vehicle without various systems in the vehicle being undesirably activated. While in the factory mode, the vehicle can accomplish multiple ignition on/off cycles while being tested or driven between stations. A steering column and connected steering wheel are provided in the vehicle, and are situated between an instrument panel and a front seat. In response to the ignition completing an on/off cycle, a controller commands a motor to move the steering wheel and steering column to a predetermined position that is based on a visibility of the instrument panel relative to the steering wheel and steering column.

18 Claims, 4 Drawing Sheets

(51) Int. Cl.
   *B62D 1/181*  (2006.01)
   *G05B 19/042* (2006.01)
   *B62D 1/16*   (2006.01)
   *B62D 1/20*   (2006.01)

(52) U.S. Cl.
   CPC .... *G05B 19/042* (2013.01); *G05B 2219/2637* (2013.01)

(58) Field of Classification Search
   CPC ......... B62D 65/16; B60S 1/026; B60R 25/20; G05B 19/042; G05B 2219/2637; B60L 2270/40; G01M 17/07
   USPC ....................................... 701/49; 73/492–493
   See application file for complete search history.

(56) References Cited

U.S. PATENT DOCUMENTS

| | | | |
|---|---|---|---|
| 10,232,873 B2* | 3/2019 | Wijffels | B62D 5/0472 |
| 10,315,691 B2* | 6/2019 | Wijffels | B62D 5/008 |
| 2006/0090464 A1* | 5/2006 | Kargilis | F15B 15/18 60/588 |
| 2006/0208169 A1* | 9/2006 | Breed | G06K 9/00624 250/221 |
| 2009/0319095 A1* | 12/2009 | Cech | B60K 35/00 701/1 |
| 2012/0024102 A1* | 2/2012 | Marion | B62K 15/00 74/493 |
| 2012/0053794 A1* | 3/2012 | Alcazar | B60N 2/0244 701/48 |
| 2013/0325264 A1* | 12/2013 | Alcazar | B62D 1/181 701/49 |
| 2014/0192181 A1* | 7/2014 | Taylor | B60C 23/0408 348/118 |
| 2015/0251540 A1* | 9/2015 | Matsuda | B60L 53/12 701/22 |
| 2016/0163133 A1* | 6/2016 | Ricci | H04W 4/21 701/33.4 |
| 2017/0162046 A1* | 6/2017 | Alanazi | B60Q 5/005 |

* cited by examiner

OPTIMIZING ALIGNMENT OF STEERING COLUMN AND STEERING WHEEL DURING VEHICLE PRODUCTION

TECHNICAL FIELD

This application relates to a system for setting and auditing a position of a steering wheel and steering column of a vehicle provided with a power tilt/telescope steering column.

BACKGROUND

A steering wheel is a control interface for a driver which relates rotational motion input at the steering wheel to an angular output at the vehicle wheels. Traditionally this is done at a fixed reduced ratio. By rotating the steering wheel to the left or right, the vehicle may be steered to the left or right, respectively. Steering wheels are generally circular having an outer ring that may be grasped by the driver's hand connected to a center hub by one or more spokes. The hub of the steering wheel may be connected to a steering shaft that runs down through a steering column, and into, under, or behind an instrument panel. In automobiles, the steering wheel shaft is typically connected to the wheels of the vehicle through a steering system. The steering system may have a gearbox to transfer movement and energy from one device to another. The gearbox may also be used to increase torque by allowing for the steering wheel to be rotated numerous revolutions while only turning the wheels a portion of a revolution. This also provides mechanical advantage in that a user is turning torque input via the steering wheel into lateral motion with some amount of mechanical advantage.

A motor may be connected to a steering system through either the input shaft (column assist power steering) or at the rack or steering gear (rack assist power steering). The motor can assist in turning of the wheel through power steering, and can also rotate the steering wheel to a desired location without the driver touching the steering wheel. Such activity may occur during automatic parking, for example.

SUMMARY

According to one embodiment, a control system for a vehicle includes an instrument panel, a steering column connected to a steering wheel, and a motor configured to move the steering column. A controller is programmed to command the motor to move the steering column and attached steering wheel to a predetermined position in response to a completion of an ignition on/off cycle, wherein the predetermined position is based on a visibility of the instrument panel relative to the steering wheel.

The command to the motor may be given in response to the completion of an ignition on/off cycle but only when the vehicle is placed in a factory mode.

According to another embodiment, a method of aligning a steering column and steering wheel relative to an instrument panel during production of a vehicle is provided. The method includes receiving a signal indicating an ignition is turned off. The method also includes, in response to receiving the signal, moving the steering column and steering wheel to a predetermined position that is based on a visibility of the instrument panel relative to the steering column and steering wheel.

According to another embodiment, a vehicle includes a processor programmed to receive a signal indicating a completion of an ignition on/off cycle, and in response to receiving the signal, move a steering wheel and steering column to a predetermined position that increases visibility of an instrument panel relative to the steering wheel and steering column.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
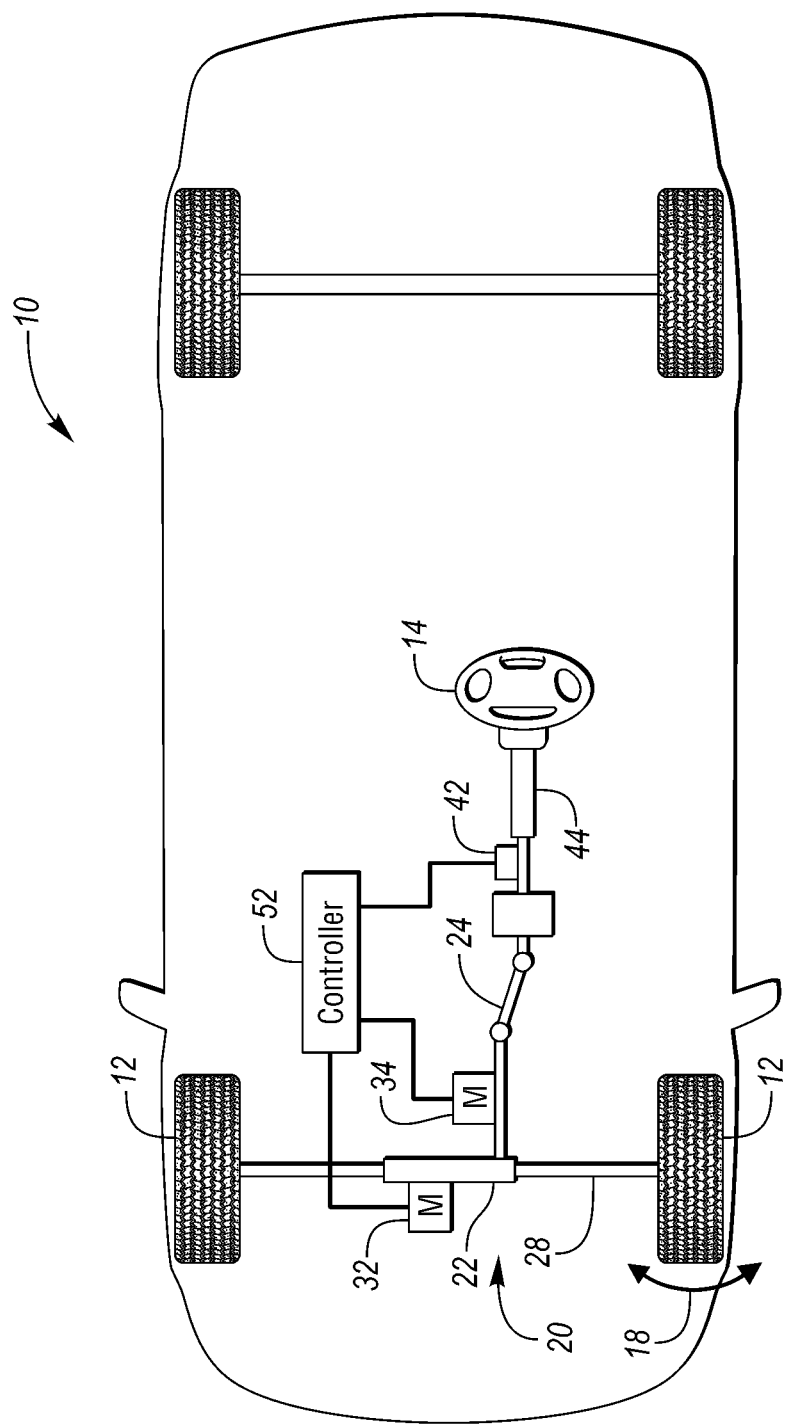
FIG. 1 is a diagrammatic view of a system for improving alignment of the steering wheel spokes in a vehicle.

FIG. 1 shows a vehicle 10 with a plurality of wheels 12 that contact and roll over the underlying terrain or ground. A steering wheel 14 may be connected, either directly or indirectly, to a pair of the wheels 12. Rotation of the steering wheel 14 correspondingly rotates a pair of the wheels 12 about their respective steering axis to steer the vehicle 10.

The steering wheel 14 may be connected to the wheel 12 by a steering system 20. The steering system 20 may comprise a gearbox 22. The gearbox 22 shown in the figure is a rack-and-pinion gearbox, although other gearboxes may be used. The gearbox 22 may be used to translate rotational movement of the steering wheel 14 into transverse movement across the vehicle 10 and to increase torque from the steering wheel 14 to the wheels 12. The steering wheel 14 may be connected to the gearbox 22 by a steering wheel shaft 24, such that rotational movement of the steering wheel 14 may be brought into the gearbox 22 by the steering wheel shaft 24.

In the case of a rack-and-pinion gearbox, a pinion gear may be disposed near the end of the steering wheel shaft 24 and mesh with teeth on a rack (not shown). As the pinion gear rotates in its transversely fixed position, the rack may move back and forth across the vehicle 10. The wheel 12 may be mounted on a steering knuckle via a hub and bearing assembly (not shown) and allowed to spin on the bearing relative to the steering knuckle. A tie rod 28 may be connected between the rack of the gearbox 22 and the steering knuckle to transfer the transverse movement of the rack to the steering knuckle. The tie rod 28 may be connected to the steering knuckle offset from a steering axis which the wheel is allowed to rotate about via ball joints or a bearing (not shown). The transverse motion of the tie rod results in rotational motion of the wheel, hub bearing and knuckle about the steering axis. The pivoting motion of the steering knuckle provides the turning output as indicated by arrow 18.

The steering system 20 may be a power assist steering system. Power assist steering systems provide additional assistance in the rotation or translation of steering system components, such that when the steering wheel 14 is turned an actuator is engaged to help rotate or translate the steering components. Power assist steering systems require less rotational input effort to provide turning output 18 and turn the wheels 12. This is especially helpful when the vehicle is not moving. This allows for smaller reductions between the steering wheel and output wheel angle. A smaller reduction corresponds to smaller lock-to-lock steering systems, creating an easier driving experience for a customer. A power assist actuator may be provided by any known actuator source, examples include hydraulic power steering pumps and electric motors. A rack-and-pinion power assist motor 32 may be connected to the rack of a rack-and-pinion gearbox 22 such that when the motor 32 is energized it assists in the movement of the rack.

A steering wheel shaft power assist motor 34 may be connected to the steering wheel shaft 24 such that when the motor 34 is energized it assists in the movement of the steering wheel shaft 24. The motor 34 may also be utilized to automatically turn the steering wheel 14 to a desired location. For example, when the vehicle is parked, the motor 34 may be commanded by a controller 52 (described below) to turn the wheel to a set position that improves visibility of the instrument panel, such as described in U.S. Pat. No. 8,666,601, which is hereby incorporated by reference. In one embodiment, the motor 34 is configured to turn the steering wheel shaft 24 which turns the steering wheel 16. A steering wheel actuator 42 may be connected to the steering wheel 14 to rotate the steering wheel 14 together with, or separately from, the movement of the steering system 20. This is done to decouple the traditional fixed steering gear ratio. Positional sensors may be placed at the steering wheel 16 or steering wheel shaft 24 to determine the location of the steering wheel 14.

The steering wheel shaft 24 may be at least partially disposed in a steering column 44. The steering column 44 may be adjusted telescopically, or vertically (tilt) about a central axis. Adjustment of the steering column 44 can be done via one of the motors described below or another motor not illustrated, or manually.

Regarding the controller, while illustrated as a single controller, the controller 52 may be part of a larger control system and may be controlled by various other controllers throughout the vehicle 10, such as a vehicle system controller (VSC). It should therefore be understood that the controller 52 and one or more other controllers can collectively be referred to as a "controller" that controls various movement of the steering wheel 14 as the examples described above. Controller 52 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 52 can communicate with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller 52 within each of the subsystems identified above.

Control logic or functions performed by controller 52 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, such as controller 52. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
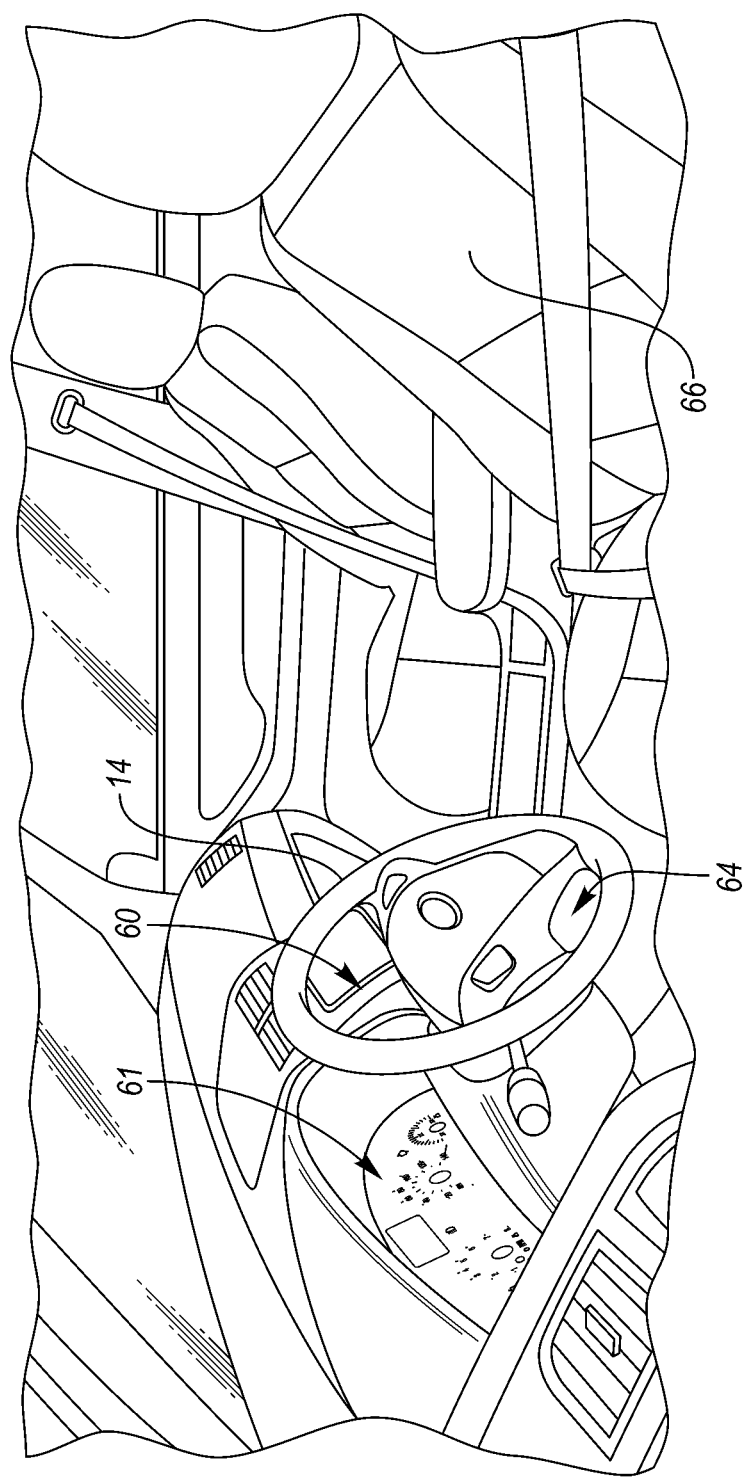
FIG. 2 is a perspective view of an interior cabin of the vehicle, illustrating the steering wheel rotated to be in a "straight ahead" position, according to one embodiment.

The controller described above is utilized to control movement of the steering wheel 14 via one or more of the motors 32, 34 and/or actuator 42. An optimum or "Clear Vision" position of the steering wheel may be preprogrammed into the controller so that the controller can automatically adjust the steering column to a set position for setting and auditing Clear Vision. For example, the controller may be programmed to turn the steering wheel 14 such that it is straight, as in the view shown in FIG. 2 to provide a clear view of the instrument panel 61 through the opening 60 from a typical viewing standpoint of someone sitting in the driver's seat 66. In this clear vision position, a top opening 60 of the steering wheel between spokes is centered to allow a clear view ("clear vision") of the instrument panel 61 and its associated electronic displays (e.g., odometer, speedometer, fuel gage, oil level gage, etc.). Also, side openings 64 of the steering wheel 14 are positioned symmetrical on either side of the steering wheel 14. The steering column is also tilted or positioned so provide a consistent position for setting and auditing the Clear Vision.

As part of the Clear Vision protocol, the steering wheel alignment is set at the vehicle assembly plant. Clear Vision quality is audited by a driver as part of the assembly plant's statistical process control. When the steering column and/or steering wheel is adjusted during assembly or production of the vehicle, Clear Vision (e.g., the driver's perceived alignment of the steering wheel and steering column relative to other portions of the interior of the vehicle) changes.

The steering wheel and steering column may be shipped to the OEM for assembly. The steering wheel and steering column may be shipped already in a particular set position that may be beneficial for ease of assembly onto the vehicle. However, this set position may not necessarily be beneficial for optimal driver experience, e.g., Clear Vision.

Furthermore, it is desirable from the customer that the steering wheel has Clear Vision and looks straight relative to the instrument panel when the vehicle is indeed traveling straight. To achieve this, there are several actions the vehicle assembly plant takes. During assembly, the steering system tie rods may be adjusted to achieve a target road wheel angle based on a steering wheel angle measurement. Also, the zero position of the absolute steering angle sensor can be set. In achieving the requirements mentioned above with current methods, there are different sources of error states which can be introduced by the process and tools. Potential error states include (1) an inclinometer tool which measures the steering wheel angle has a reference plane of the earth, and not of the vehicle body or instrument panel which creates a potential for noise, (2) the inclinometer tool must attach externally to the steering wheel which can have part-to-part variability and compliance error, and (3) a Clear Vision audit tool inclinometer attaches to the vehicle to audit for alignment capability, but this tool can have potential noise factors and cause damage to the steering wheel appearance.

Therefore, according to various embodiments described herein, a method and algorithm is provided to set the steering wheel and steering column to an ideal position during the factory mode. The ideal position or Clear Vision position can be set after every ignition in/off cycle during the factory mode. Keeping this function only during the factory mode will allow the steering column to function normally after the vehicle leaves the factory. This eliminates a manual operator-dependent process, facilitating quality improvements, and minimizes manufacturing cycle time by minimizing operator interventions.

In one embodiment, the steering wheel 14 is coupled to a steering system shaft that is, in turn, coupled to a rack gear. This can be done through two universal joints. When a universal joint connects two rotating shafts at an offset angle, the output is a sinusoidal function of the constant input rotational velocity. Therefore, a second universal joint is incorporated and is positioned so it is always out of phase with the first universal joing, thus canceling the sinusoidal output. The wheel has constant velocity, the steering system shaft has a sinusoidal velocity, and the output of the steering system shaft (or input to the rack gear) has constant velocity. When the steering column angle changes, the angle of the universal joint also changes. If the rack gear is fixed (i.e., the wheels are not "steering") and the steering column tilt angle changes, the steering wheel must physically rotate slightly. Therefore, with no steering motor, if an operator were to hold the wheels in a straight-ahead position, the steering wheel would rotate slightly when the column tilt is adjusted from bottom to top. If the operator set the Clear Vision with the column in the lowest position and the auditor were to raise the column to its highest tilt position, the auditor's reading would be different than what the vehicle was originally set. Therefore, this disclosure discloses adjusting the column when the vehicle is in the factory mode to a specific position (e.g., its highest tilt position) every time the vehicle goes through a key on/off cycle.

Also, according to other embodiments of this disclosure, a new type of mechanical fixture and method is provided which can precisely align the steering wheel to the instrument panel. Once aligned with the fixture, the absolute steering wheel angle sensor module in the vehicle can be trimmed to this zero position.

Figure 3:
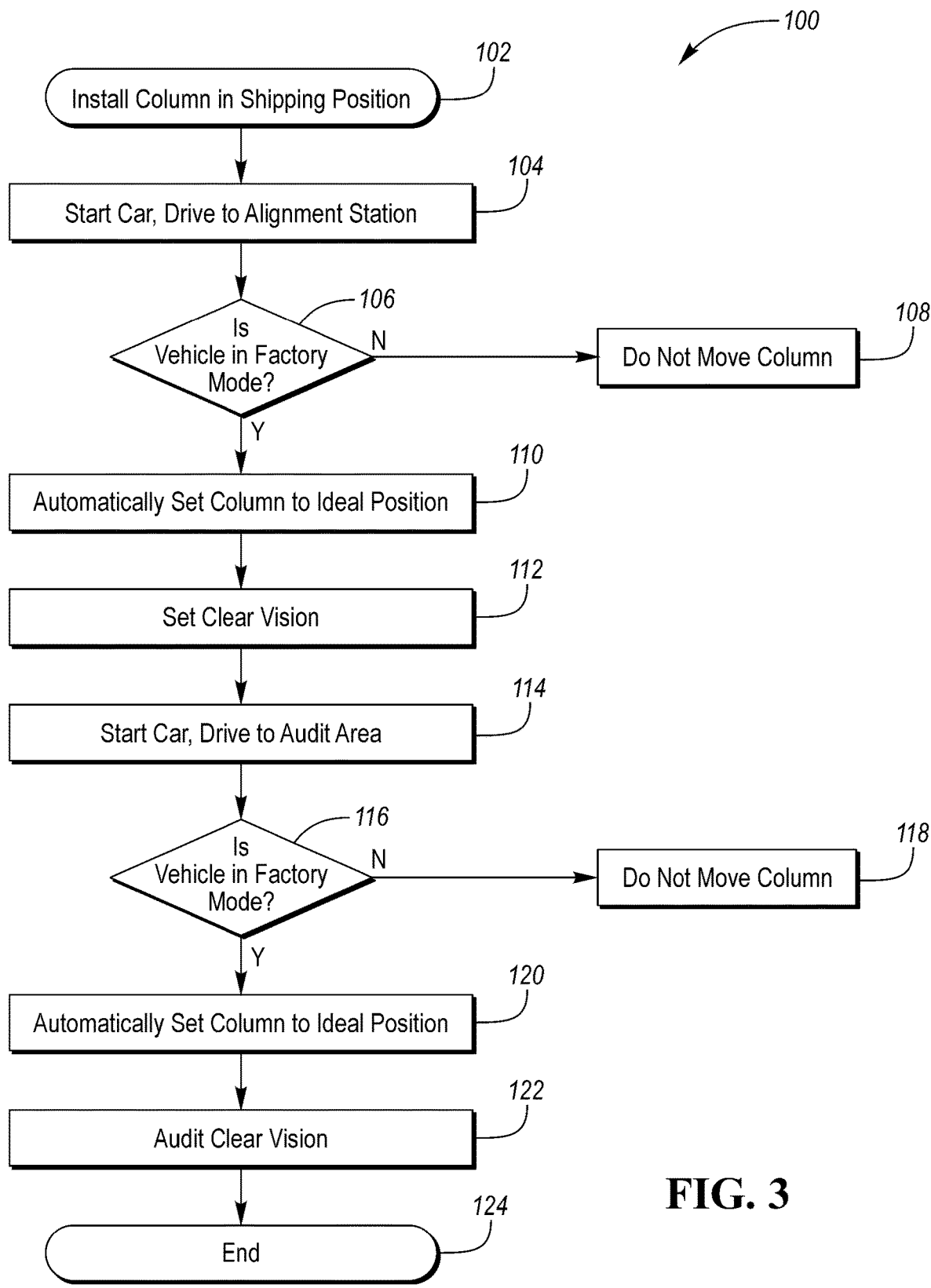
FIG. 3 is a flow chart illustrating a method at least partially performed by a controller described below for setting a steering column and steering wheel to an idea position for setting and auditing of clear vision, according to one embodiment.

FIG. 3 is a flow chart 100 illustrating a method for setting a steering column and steering wheel to an idea position for setting and auditing of clear vision, according to one embodiment. At 102, the steering column is installed onto the vehicle in its position that it was received from the shipper. In other words, the steering column is installed in its shipping position. At 104, at some point during assembly, the vehicle is started and driven to the alignment station at which the steering wheel and steering column are properly aligned (at 112). The vehicle is then turned off. This completes an on/off cycle of the vehicle. In response to a completion of the on/off cycle, the controller will automatically set the steering column and/or steering wheel to the ideal position for Clear Vision audits, but only when the vehicle is in the factory mode, described below.

At 106, the controller determines if the vehicle is in "factory mode." There are three typical modes in which the vehicle can be placed in—factory mode, transport mode, and normal mode(s). The factory mode is used while the vehicle is in the plant, e.g., during assembly. While in the factory mode, which will be described further below, many features are allowed or disallowed by different rules than during the normal mode. For example, the rear defroster can be turned on without the ignition running. The transport mode is used when the vehicle is being shipped from the plant to the dealerships. During the transport, non-essential features are turned off to conserve the battery. The normal mode, or customer mode, is the mode in which the vehicle is available and driven by the customer.

Whether the vehicle is in the factory mode may be determined by the controller based on a number of factors. For example, as mentioned above, the rear defrosters may be enabled to be turned on without the vehicle's engine running, which may be a requirement of the normal mode. In another embodiment, the factory mode being enabled is indicated by the power lift gate or power trunk not being operable; pressing a button that would normally open the power lift gate or trunk would only unlatch it, but the associated motor would not open it. In another embodiment, the factory mode being enabled is indicated by the vehicle's alarm not being armed or armable. In another embodiment, the factory mode being enabled is indicated by the passive key unlock feature not working. A passive key unlock feature is known in the art as a key fob equipped with the ability to allow the user to, when the key fob is close to the vehicle, unlock and start the vehicle without being inserted into any part of the vehicle. In another embodiment, the factory mode being enabled is indicated by the approach lighting (e.g., lights illuminating when the user with the key fob approaches the vehicle) being disabled. In another embodiment, the factory mode being enabled is indicated by the tire pressure monitor sensor (TPMS) data being ignored and not causing a visual or audible alarm to turn on. In another embodiment, the factory mode being enabled is indicated by a delay of the accessory timer being reduced in value. The accessory timer is part of the system that keeps the radio on, allows windows to be rolled down, etc. after the car has been shut off until a door is opened or until the timer expires. This timer is reduced when in the factory mode. Finally, the factory mode can be set by user input via a user interface or diagnostic tool.

If the controller determines that the vehicle is not in the factory mode, then at 108 the steering column is not moved. If, however, the controller determines that the vehicle is in the factory mode at 106, then at 110 the controller automatically sets the steering column and wheel to an ideal position. In other words, in response to the completion of the on/off cycle of the vehicle's engine and a positive determination that the vehicle is in the factory mode, the controller automatically sets the steering column to the ideal position. This position can be preprogrammed or preset in the controller or associated hardware. Then at 112, the operator sets the Clear Vision during the normal wheel alignment process. When in factory mode, the steering column can be set to an optimum position at every on/off cycle of the vehicle's engine or ignition.

At 114, the vehicle may be started and driven to an audit area where an audit is performed. The vehicle is then turned off at the audit station. At 116, the controller again runs a check to determine if the vehicle is still in factory mode at 116. If the vehicle is not in factory mode, then the steering wheel and/or column are not moved at 118. If, however, the vehicle is in factory mode, then the controller automatically sets the steering column to the ideal position, e.g., a position for Clear Vision, at 120. In other words, since another on/off cycle is complete, and the vehicle is in audit mode, another automatic adjustment of the steering column is accomplished. Then, at 122, an audit on the Clear Vision may be performed in which one or more tools or sensors are utilized to determine if the steering wheel is positioned straight ahead when the wheels are also pointed straight ahead. This method ends at 124.

Figure 4:
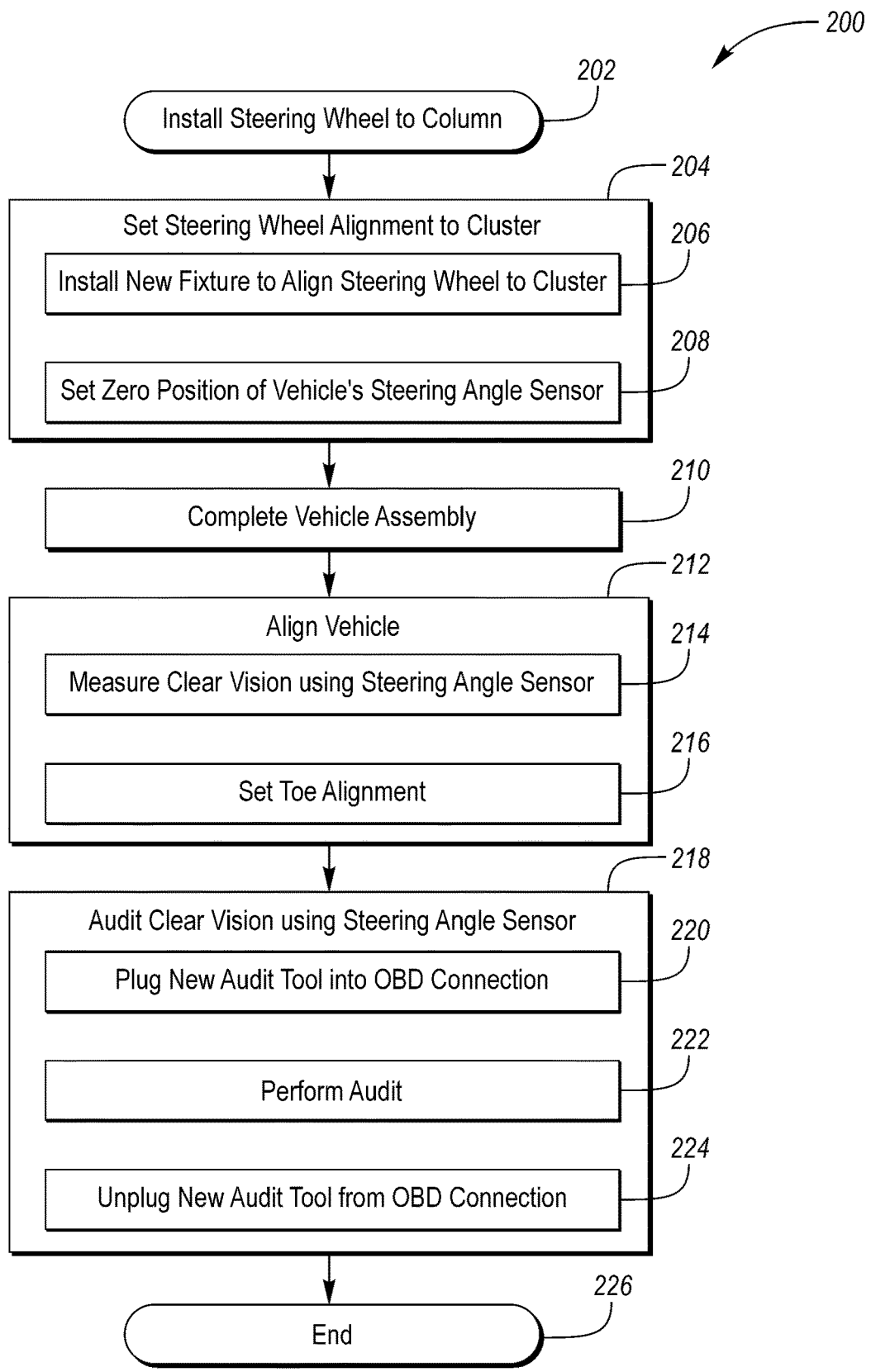
FIG. 4 is a flow chart illustrating another example of a method at least partially performed by a controller described below for setting a steering column and steering wheel to an ideal position during setting and auditing of clear vision.

FIG. 4 shows a flow chart 200 of an exemplary process of installing a steering wheel and column to a vehicle during assembly and testing the alignment of the steering wheel and column. At 202, the steering wheel is installed to the steering column. Then, at 204, the steering wheel alignment is set with respect to the instrument panel or cluster. As described above, the wheel may be set to provide optimum viewing of the instrument panel or cluster from the vantage point of a person sitting in the driver seat. At 206, a new fixture is installed to align the steering wheel to the cluster. At 208, once the steering wheel and/or column are positioned, a zero position is set as the "default" position, ideal position, or Clear Vision position. The assembly is complete at 210.

At 212, the road wheels are aligned after assembly, which includes measuring the Clear Vision using the steering wheel angle sensor at 214, and setting toe alignment at 216.

An audit of the Clear Vision may be performed at 218, which can be done using the steering wheel angle sensor. The audit may include plugging in the audit tool into the OBD connection port at 220, performing the audit electronically at 222 by comparing the output of the steering wheel angle to the zero position that was previously set, and unplugging the audit tool from the OBD connecting port at 224. A comparison of the current output of the steering wheel angle sensor and the previous zero point steering wheel angle sensor yields a result that is either acceptable or unacceptable. If for example, the difference between the steering wheel angle sensor and the zero point is within 1 degree, the audit is complete as successful.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A control system for a vehicle, comprising:
   an instrument panel;
   a steering column connected to a steering wheel;
   a motor configured to move the steering column; and
   a controller programmed to, during production, command the motor to move the steering column and attached steering wheel to a predetermined position based on a visibility of the instrument panel relative to the steering wheel in response to the vehicle being set to operate in a factory mode and an ignition being turned off while operating in the factory mode.

2. A vehicle comprising:
a processor programmed to, during production:
receive a signal indicating an ignition being turned off while the vehicle is operating in a factory mode, and
in response to receiving the signal, move a steering wheel and steering column to a predetermined position that increases visibility of an instrument panel relative to the steering wheel and steering column.

3. The control system of claim 1, wherein the factory mode is defined at least in part by a disabling of an ability to arm an alarm system.

4. The control system of claim 1, wherein the factory mode is defined at least in part by a disabling of an ability to unlock the vehicle via a passive key fob.

5. The control system of claim 1, wherein the controller is further programmed to command the at least one motor to move the steering column and steering wheel to a different predetermined position in response to a completion of an ignition on/off cycle and the vehicle being operated in a normal mode.

6. The control system of claim 1, wherein the instrument panel includes a plurality of electronic displays and the visibility includes visibility of the plurality of electronic displays relative to the steering column and steering wheel.

7. The control system of claim 6, wherein the visibility of the instrument panel relative to the steering wheel and column is from a perspective of an operator seated in front of the steering wheel and column.

8. A method of aligning a steering column and steering wheel relative to an instrument panel during production of a vehicle, comprising:
via a controller, receiving a signal indicating an ignition is turned off; and
in response to receiving the signal, actuating a motor to move the steering column and steering wheel to a predetermined position that is based on a visibility of the instrument panel relative to the steering column and steering wheel.

9. The method of claim 8, wherein the moving is initiated in response to receiving the signal and receiving a second signal indicating the vehicle is operating in a factory mode.

10. The method of claim 9, further comprising disabling a passive key unlock system in response to receiving the second signal.

11. The method of claim 9, further comprising enabling a rear defroster to be turned on without an ignition being activated in response to receiving the second signal.

12. The method of claim 8, wherein the predetermined position is such that the steering wheel is at a maximum allowable height from a floor of the vehicle.

13. The vehicle of claim 2, wherein the instrument panel includes a plurality of displays and the visibility includes visibility of the plurality of displays relative to the steering column and steering wheel.

14. The vehicle of claim 13, wherein the visibility of the instrument panel relative to the steering column and steering wheel is from a perspective of an operator seated behind the steering column and steering wheel relative to a front of the vehicle and looking at the instrument panel through the steering wheel.

15. The vehicle of claim 2, wherein the vehicle includes a power liftgate powered by a liftgate motor, and the factory mode includes a disabling of the power liftgate.

16. The vehicle of claim 2, wherein the vehicle includes an alarm system, and the factory mode includes a prevention of an ability to arm the alarm system.

17. The vehicle of claim 2, wherein the vehicle includes a tire pressure monitor sensor (TPMS), and the factory mode includes disabling of a visual or audible alarm when the TPMS indicates tire pressure being below a threshold that would normally activate the visual or audible alarm.

18. The vehicle of claim 14, wherein the steering column and steering wheel is situated rearward of the instrument panel relative to the front of the vehicle.

\* \* \* \* \*